UNITED STATES PATENT OFFICE.

CHARLES F. CARPENTER, OF LOUISVILLE, KENTUCKY.

IMPROVEMENT IN PROCESSES FOR CASTING GLASS PLATE.

Specification forming part of Letters Patent No. 185,428, dated December 19, 1876; application filed March 8, 1876.

*To all whom it may concern:*

Be it known that I, CHARLES F. CARPENTER, of Louisville, county of Jefferson, and State of Kentucky, have invented an Improved Process of Casting Glass Plates, of which the following is a specification:

This invention relates to a process of casting glass plates.

It is well known to manufacturers that plate-glass cast by the usual process has wavy sides after becoming cold. Although it may have the same thickness throughout, yet its sides are not level, and it requires considerable grinding away of the glass to bring the glass plate into a proper condition for polishing. This imperfection is known as the "chill," and is, to a considerable extent, caused by the lower side of the glass plate, which rests on the casting-slab, being more rapidly cooled than the upper side, which is exposed to the air until the plate has solidified enough to be removed to the annealing-oven.

I prevent the glass plates from having the above-mentioned imperfection (called "the chill") by the following process: Immediately after the roller has flattened a portion of the glass into a plate I equalize the cooling of the sides of the glass plates and keep them level by applying a body of metal over the glass, that rapidly abstracts the heat from its upper side, until the glass hardens to such an extent that it will retain its improved form.

In carrying out my invention the melted glass is poured on a casting-slab. A roller then forms the glass into a plate, in the usual manner. As soon as the roller commences to flatten the melted glass into a plate, I apply a body of metal over the glass plate, which rapidly cools its upper surface about equal to the cooling that the lower side of the plate gets by being in contact with the casting-slab.

I do not confine myself to any particular form or size for the heat-extracting body that I apply over the glass. My object is, that it shall keep the sides of the plate level, and have conducting power enough, according to the required thickness of the glass plate, to abstract the heat from the upper surface of the glass with sufficient rapidity to produce the desired effect.

I do not claim the process of pouring glass on a casting-slab and forming it into a plate by a roller, as that is old and well known.

I claim as my invention—

The process of casting glass plates with an improved form by applying over the glass plate, while it is in a plastic state, a body that will keep its sides level and abstract the heat from its upper surface more rapidly than when it is exposed to the air, substantially as above described.

CHAS. F. CARPENTER.

Witnesses:
HENRY L. WERNE,
ED. F. POOLEY.